United States Patent
Lee et al.

(10) Patent No.: US 7,809,327 B2
(45) Date of Patent: Oct. 5, 2010

(54) APPARATUS AND METHOD FOR CONTROLLING POWER IN CELLULAR SYSTEM USING WIRED RELAY STATIONS

(75) Inventors: Jae-Hoon Lee, Seoul (KR); Seong-Taek Hwang, Pyeongtaek-si (KR); Won-Jin Sung, Seoul (KR); Jin-Woo Choe, Seoul (KR); Byoung-Seok Lee, Nonsan-si (KR); In-Hong Shong, Seoul (KR)

(73) Assignees: Samsung Electronics Co., Ltd., Maetan-Dong, Yeongtong-Gu, Suwon-Si, Gyeonggi-Do, Korea (KR); Industry-University Corporation Foundation Sogang University, Sinsu-Dong, Mapo-Gu, Seoul (KR)

( * ) Notice: Subject to any disclaimer, the term of this patent is extended or adjusted under 35 U.S.C. 154(b) by 515 days.

(21) Appl. No.: 11/977,473

(22) Filed: Oct. 25, 2007

(65) Prior Publication Data
US 2008/0119216 A1 May 22, 2008

(30) Foreign Application Priority Data
Nov. 21, 2006 (KR) ...................... 10-2006-0115086

(51) Int. Cl.
*H04B 1/00* (2006.01)
*H04B 7/00* (2006.01)
*H04B 17/00* (2006.01)
*H04B 3/36* (2006.01)
*H04W 24/00* (2009.01)

(52) U.S. Cl. .......................... 455/7; 455/522; 455/69; 455/67.11; 455/456.2; 455/507; 455/510; 455/512; 455/524

(58) Field of Classification Search ............ 455/7, 455/522, 69, 67.11, 456.2, 507, 510, 512, 455/524
See application file for complete search history.

(56) References Cited

U.S. PATENT DOCUMENTS 6,035,209 A * 3/2000 Tiedemann et al. ......... 455/522

(Continued)

FOREIGN PATENT DOCUMENTS

KR 2006-105187 10/2006

(Continued)

OTHER PUBLICATIONS

Comstock, David, "Comments on Terminology;" IEEE 802.16J-06/096, No. 45; Sep. 19, 2006; XP002535825.

(Continued)

*Primary Examiner*—Matthew D Anderson
*Assistant Examiner*—Bobbak Safaipour
(74) *Attorney, Agent, or Firm*—Cha & Reiter, LLC

(57) ABSTRACT

A method of controlling power in a Base Station (BS) of a cellular system using wired Relay Stations (RSs) includes the RSs and the BS individually performing scheduling of packets to be transmitted to Mobile Stations (MSs) in respective areas of coverage, the BS increasing a difference between a sum of signals to be transmitted and a sum of interference signals according to a scheduling result, guaranteeing a minimum amount of data to be received by each MS, and calculating a power allocation solution of each MS, which satisfies a condition that the power allocation solution is in a range of allocatable power, which was pre-set by each of the RSs and the BS, and the RSs and the BS performing sub-channel allocation and power allocation according to the power allocation solution satisfying the condition.

14 Claims, 6 Drawing Sheets

U.S. PATENT DOCUMENTS

| | | | | |
|---|---|---|---|---|
| 6,072,784 | A * | 6/2000 | Agrawal et al. | 370/311 |
| 6,400,941 | B1 * | 6/2002 | Nara | 455/422.1 |
| 6,748,233 | B1 * | 6/2004 | Arnold et al. | 455/522 |
| 6,947,708 | B2 * | 9/2005 | Fattouch | 455/67.16 |
| 7,035,632 | B2 * | 4/2006 | Gutowski | 455/423 |
| 7,072,670 | B2 * | 7/2006 | Sato et al. | 455/456.1 |
| 7,190,930 | B2 * | 3/2007 | Ohkubo et al. | 455/67.11 |
| 7,197,326 | B2 * | 3/2007 | Acampora | 455/522 |
| 7,463,890 | B2 * | 12/2008 | Herz et al. | 455/445 |
| 7,689,240 | B2 * | 3/2010 | Anderson | 455/522 |
| 2007/0099647 | A1 * | 5/2007 | Lee et al. | 455/522 |

OTHER PUBLICATIONS

Herscovici, Naftali (Tuli), et al.; "Distributed Power Control In CDMA Cellular Systems;" IEEE Antennas & Propagation Magazine, vol. 42, No. 4; Aug. 2000; XP011081271.

* cited by examiner

APPARATUS AND METHOD FOR CONTROLLING POWER IN CELLULAR SYSTEM USING WIRED RELAY STATIONS

CLAIM OF PRIORITY

This application claims the benefit to the earlier filing date, under 35 U.S.C. §119(a), to that patent application entitled "Apparatus And Method For Controlling Power In Cellular System Using Wired Relay Stations," filed in the Korean Intellectual Property Office on Nov. 21, 2006 and assigned Serial No. 2006-115086, the contents of which are incorporated herein by reference.

BACKGROUND OF THE INVENTION

1. Field of the Invention

The present invention relates to wired RS system or Radio over Fiber (RoF) communication system and more specifically to a centralized power control method between a Base Station (BS) and Relay Stations (RSs) to improve user fairness and outage probability using a dedicated line and band.

2. Description of the Related Art

In a cellular communication system, throughput and Quality of Service (QoS) per user are major indexes used to determine transmission efficiency. Power control is performed to improve these performance indexes. In particular, by providing uniform receive power to users, an index indicating signal quality, i.e. a Signal to Interference and Noise Ratio (SINR), is maintained as a constant value. Many power control algorithms achieve independent power control for individual Base Stations (BSs) by focusing on power control of each Mobile Station (MS) in a cell.

As illustrated in FIG. 1, a Radio over Fiber (RoF) system can be a cellular system in which a cell is divided into small cells by dividing a service area according to each of BS/Relay Stations (RSs). A plurality of conventional power control algorithms are independently applied in each service area. When a frequency reuse coefficient in a cell is 1, i.e. if the same frequency is used in each service area, MSs, such as an MS A, located in a coverage boundary suffer severe interference due to an interference signal from another service area. When the BS performs power control independently, the BS raises a SINR value by allocating maximum power to the MS A. However, in this case, an amount of interference in service areas of other RSs is increased due to an increase of power from the BS to MS A. In particular, in MSs located in boundaries of other service areas, e.g. an MS B illustrated in FIG. 1, the SINR value is decreased due to an increase of the magnitude of an interference signal. Thus, if the independent power control is performed in service areas of the BS and the RSs without an information exchange between allocated powers, it is limited to improve SINR values of MSs located in boundaries of divided cells.

SUMMARY OF THE INVENTION

An aspect of the present invention is to substantially solve at least the above problems and/or disadvantages and to provide at least the advantages below. Accordingly, an aspect of the present invention is to maximize Quality of Service (QoS) and fairness for users by performing combined power control between a Base Station (BS) and Relay Stations (RSs).

According to one aspect of the present invention, there is provided a method of controlling power in a Base Station (BS) of a cellular system using wired Relay Stations (RSs), the method comprising the RSs and the BS individually performing scheduling of packets to be transmitted to Mobile Stations (MSs) in respective areas of coverage, the BS increasing a difference between a sum of signals to be transmitted and a sum of interference signals according to a scheduling result, guaranteeing a minimum amount of data to be received by each MS, and calculating a power allocation solution of each MS, which satisfies a condition that the power allocation solution is in a range of allocatable power, which was pre-set by each of the RSs and the BS and the RSs and the BS performing sub-channel allocation and power allocation according to the power allocation solution.

According to another aspect of the present invention, there is provided a system for controlling power in a cellular system using wired Relay Stations (RSs), the system comprising a plurality of RSs for transmitting control information of Mobile Stations (MSs) in respective areas of coverage to a Base Station (BS), independently performing scheduling of packets to be transmitted to respective MSs using individual packet schedulers, performing channel coding, constellation mapping, and modulation of frames to be transmitted to the respective MSs, and transmitting the frames to the respective MSs and the BS for performing scheduling of packets to be transmitted to respective MSs in its coverage using individual packet schedulers, performing channel coding, constellation mapping, and modulation of frames to be transmitted to the respective MSs, transmitting the frames to the respective MSs, performing combined power allocation for the packets to be transmitted to the respective MSs, which were scheduled by respective RSs or the BS, based on the control information received from the plurality of RSs, wherein each transmission frame of the BS and the RSs is comprised of N sub-channels, the transmission frames comprised of N sub-channels are synchronized in a frequency domain and a time domain, a single channel is allocated to only a single MS, and the schedulers allocate the same sub-channel to the respective MSs at the same time.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Embodiments of the present invention will be described herein below with reference to the accompanying drawings. The invention may, however, be embodied in many different forms and should not be construed as being limited to the embodiments set forth herein. Rather, the embodiments shown herein are provided so that this disclosure will be thorough and complete, and will fully convey the concept of the invention to those skilled in the art.

In the specification, a centralized cellular system, in which all algorithms for communications between a Base Station (BS)/Relay Stations (RSs) and Mobile Stations (MSs) in a Radio over Fiber (RoF) system are executed by the BS and the RSs perform only transmission, is set as a basic model. Thus, control information of all signals is collected or initiated at the BS. The BS allocates optimal power to each MS based on the control information. A general power allocation pattern is illustrated in FIG. 2.

Figure 1:
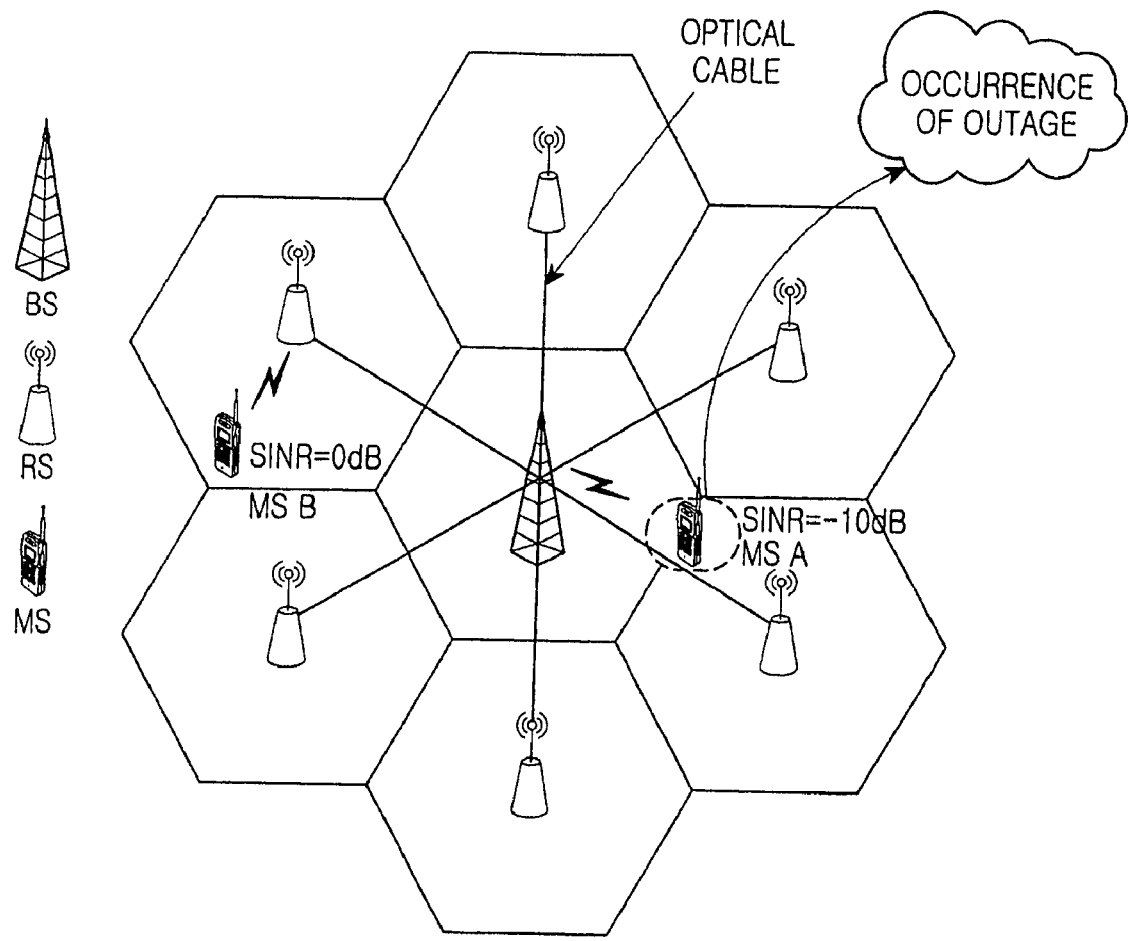
FIG. 1 is a diagram of a cellular system using wired Relay Stations (RSs) according to an exemplary embodiment of the present invention.
Figure 2:
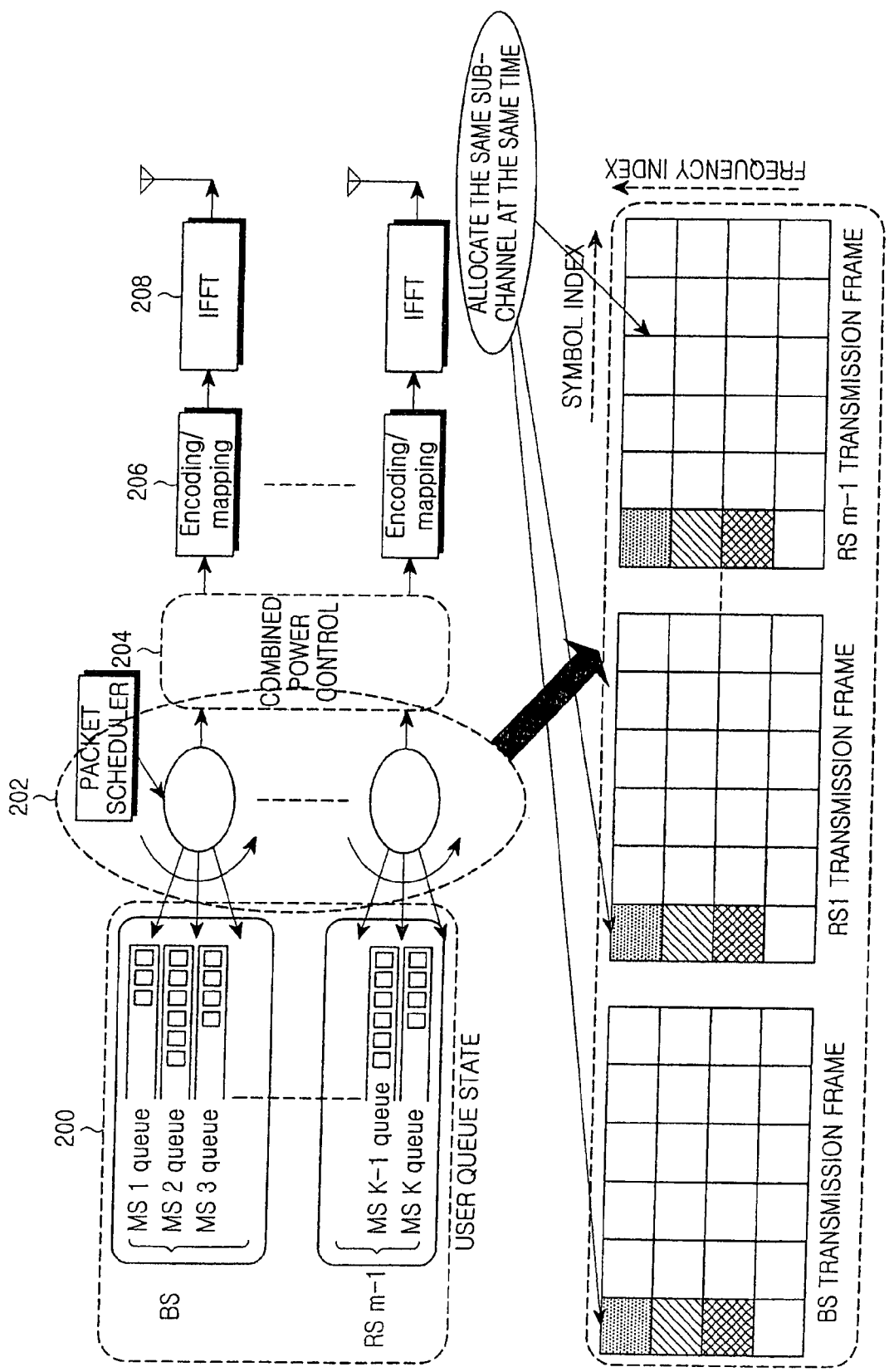
FIG. 2 is a diagram of a power control system in a cellular system using wired RSs according to an exemplary embodiment of the present invention.

Referring to FIG. 2, in the current embodiment, packets to be transmitted to respective MSs, which are stored in respective user cues 200 in a BS and RSs, are independently scheduled by respective individual packet schedulers 202, and a combined power control module 204 performs combined power allocation for the scheduled packets to be transmitted to the respective MSs. The other operations, i.e. channel coding, constellation mapping, and Inverse Fast Fourier Transform (IFFT) modulation, are independently performed by a channel coder/constellation mapper 206 and an IFFT modulator 208 of each of the BS and the RSs, and the packets are transmitted to the respective MSs. In order to apply a method according to an exemplary embodiment of the present invention to the system illustrated in FIG. 2, the assumptions below are premised.

a. each of the BS and the RSs has a precise service area. That is, each of the BS and the RSs transmits data to a single MS;

b. a transmission frame of each of the BS and the RSs is comprised of N sub-channels, and the transmission frames comprised of N sub-channels are synchronized in a frequency domain and a time domain;

c. interference to an MS occurs only on the same channel;

d. each of the BS and the RSs allocates a single channel to a single MS; and e. schedulers of the BS and the RSs allocate the same sub-channel to respective MSs at the same time as illustrated in FIG. 2.

The system described above can be represented using a mathematical model, and to do this, parameters illustrated in Table 1 are defined.

TABLE 1

| Parameter | Description |
|---|---|
| $t_n$ (n = 1, ..., N) | Scheduling time duration for which a single sub-channel is allocated. |
| k (k = 1, ..., K) | MS index |
| m (m = 1, ..., M) | Node (BS/RSs) index |
| $h_{k,m}$ | Channel between a node m and an MS k |
| s(m) | Set of MS indexes receiving a service from a node m |
| $s_{k,m}$ | Signal transmitted from a node m to an MS k |
| $y_{k,m}$ | Signal received from a node m to an MS k |
| $w_k$ | Noise signal in an MS k |
| $P_{min}, P_{max}$ | Minimum value and maximum value of power allocated to an MS k |

Using Table 1, a channel matrix H, a transmission signal matrix X, and a noise matrix W are represented as.

$$H = \begin{bmatrix} h_{1,1} & \cdots & h_{1,M} \\ \vdots & \ddots & \vdots \\ h_{K,1} & \cdots & h_{K,M} \end{bmatrix}, X = \begin{bmatrix} x_{1,1} & \cdots & x_{1,M} \\ \vdots & \ddots & \vdots \\ x_{K,1} & \cdots & x_{K,M} \end{bmatrix}, W = \begin{bmatrix} w_1 \\ \vdots \\ w_K \end{bmatrix} \quad (1)$$

If N sub-channels have the same flat-fading characteristic, a received signal matrix Y is represented as.

$$Y = HX^T \quad (2)$$

wherein $X^T$ represents transpose matrix of the matrix S of the transmission signal matrix X.

Further, a (j, i) component of the received signal matrix Y means the signal intensity of a case where a signal transmitted from a specific RS to an MS i is received by an MS j, and is represented by Formula 3.

$$y_{j,i} = \sum_{m=1}^{M} h_{j,m} \cdot x_{i,m} \quad (3)$$

Figure 3:
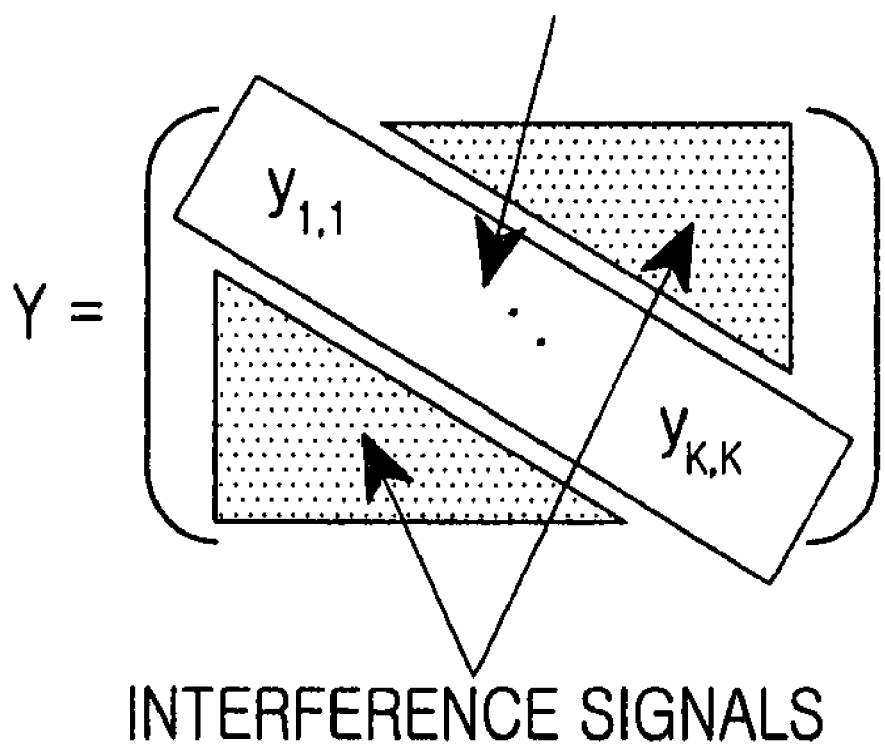
FIG. 3 is a signal matrix of a signal transmitted from a RS to a Mobile Station (MS) according to an exemplary embodiment of the present invention.

The received signal matrix Y possesses the characteristic illustrated in FIG. 3. That is, diagonal elements denote desired signals, and off-diagonal elements denote interference signals. If each of the BS and the RSs has a precise service area, components indicating transmission signals that do not belong to a coverage area of an individual BS/RS, are all 0 in the matrix X. This can be represented as:

$$x_{k,m} = \begin{cases} x_{k,m} & \text{if } k \in s(m) \\ 0 & \text{otherwise} \end{cases} \quad (4)$$

In addition, when each of the BS and the RSs transmits data to only a single MS at a specific scheduling time $t_n$, the other elements in the set s(m) have the value of 0. Thus, row components of the matrix X are all 0 or only one of them has a transmission signal value, and only maximum, M, components among a total of transmission matrix components have a non-zero value. In this case, the (j, i) component of the received signal matrix Y is represented as:

$$y_{j,i} = h_{j,m} \cdot x_{i,m}, i \in s(m) \quad (5)$$

In this case, a desired signal and an interference signal of an MS k are respectively represented by Formulas 6 and 7, respectively;

$$S_k = h_{k,m} \cdot x_{k,m}, k \in s(m) \quad (6)$$

$$I_k = \sum_{p \neq m}^{M} h_{k,p} \cdot x_{s(p),p} \quad (7)$$

A Signal to Interference and Noise Ratio (SINR) in the MS k is represented by Formula 8.

$$\gamma_k = \frac{|h_{k,m}|^2 \cdot |x_{k,m}|^2}{\sum_{p \neq m}^{M} |h_{k,p}|^2 \cdot |x_{s(p),p}|^2 + w_k} \quad (8)$$

An amount of data, which can be transmitted to the MS k, is represented by Formula 9.

$$d_{bit}^k = BW_{sub-channel} \cdot \log_2(1+\gamma_k) \quad (9)$$

An amount of data transmitted in the entire system is represented by Formula 10.

$$\text{Throughput}_{system} = \sum_k d_{bit}^k \quad (10)$$

In order to maximize the throughput of the entire system and guarantee the minimum amount of data received by each MS, a ratio of the diagonal components of the received signal matrix Y to the components indicating the interference signals, i.e. the SINR value γ, must be maximized. In order to maximize the SINR value γ, in the current embodiment, a combined power control method using Linear Programming (LP) is suggested.

Objective Function $$\text{maximize} \sum Y_{diagonal\ entry} - \sum Y_{off-diagonal\ entry} \quad (11)$$

$$\Leftrightarrow \text{maximize} \sum_k |h_{k,m}|^2 \cdot |x_{k,m}|^2 - \sum_k \sum_{p \neq m}^M |h_{k,p}|^2 \cdot |x_{s(p),p}|^2 + w_k \quad (12)$$

Constraints
1. Minimum SINR value that must be guaranteed $$\frac{|h_{k,m}|^2 \cdot |x_{k,m}|^2}{\sum_{p \neq m}^{M} |h_{k,p}|^2 \cdot |x_{s(p),p}|^2 + w_k} \geq \gamma_k^{minimum\ SINR}, \forall k \quad (13)$$

2. Power range $$\sqrt{p_{min}} \leq |x_{k,m}| \leq \sqrt{p_{max}}, \forall k \quad (14)$$

Figure 4:
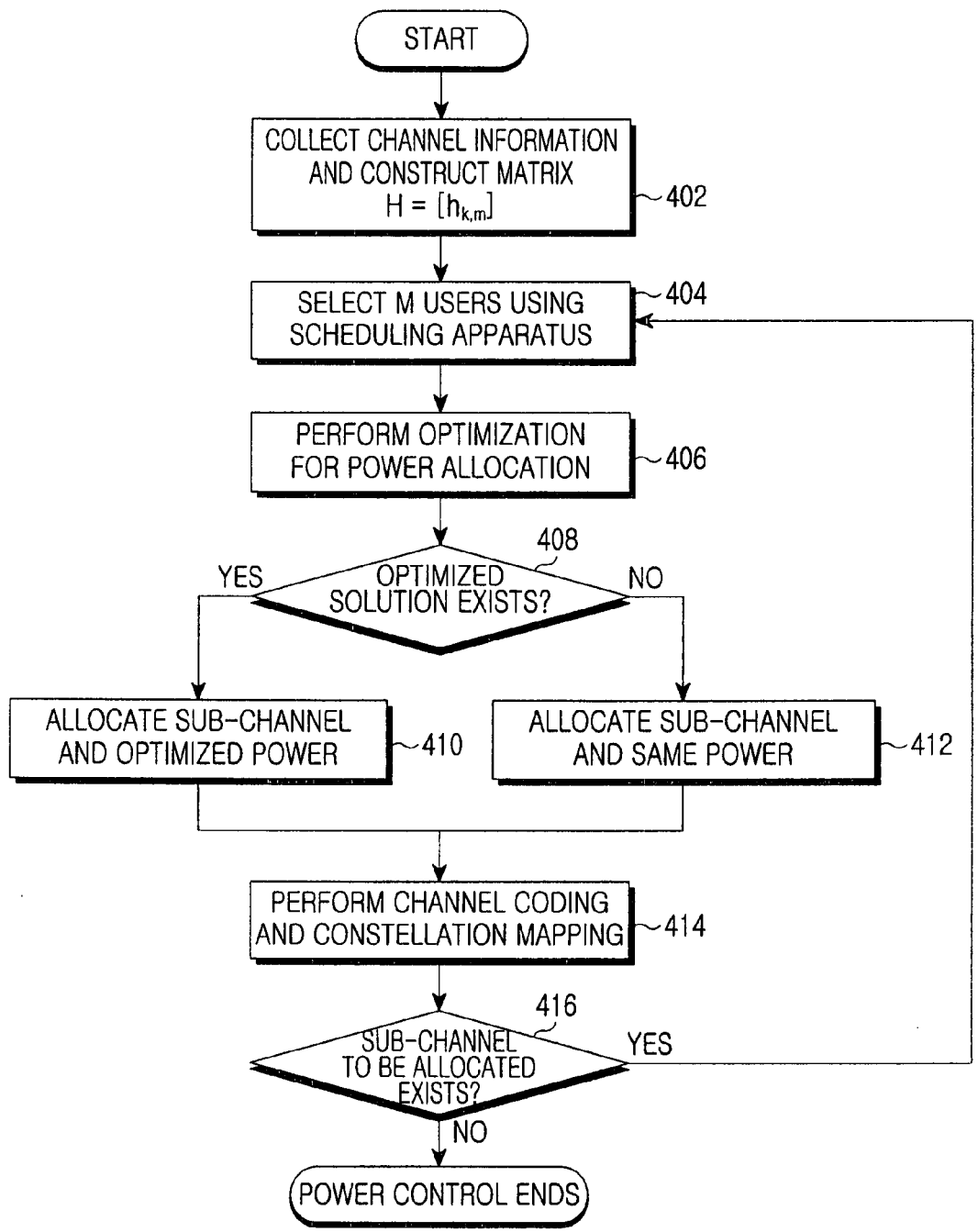
FIG. 4 is a flowchart illustrating a power control process according to an exemplary embodiment of the present invention.

Formula 11 indicates a formula for maximizing a difference between a sum of the diagonal matrix components and a sum of the interference signal components in the received signal matrix Y. Formula 11 is represented by Formula 12 in detail. If the difference between the sum of signals that must be transmitted and the sum of interference signals is large, an SINR value of the entire system is increased, resulting in an increase of transmission efficiency. The first constraint condition indicates the minimum SINR value required to guarantee the minimum data amount to each MS (i.e., QoS of an individual user). The second constraint condition indicates the maximum value and the minimum value of power, which can be allocated by each of the BS and the RSs. The combined power control method is illustrated in FIG. 4.

The values derived by the LP according to an exemplary embodiment of the present invention are used to obtain a power value allocated to each MS. Each of the BS and RSs allocates power derived in an optimizing method to a packet selected by the scheduling apparatus illustrated in FIG. 2, performs a sub-channel allocation process, and transmits the packet to an individual MS.

The power control process will now be described in more detail with reference to FIG. 4. In step 402, channel information is collected, and the matrix H represented by Formula 1 is determined. M users are selected by a scheduling apparatus in step 404. Optimization for power allocation as represented by Formulas 11 through 14 is performed in step 406. It is determined in step 408 whether an optimized solution exists. If it is determined in step 408 that an optimized solution exists, a sub-channel and optimized power are allocated in step 410. If it is determined in step 408 that an optimized solution does not exist, a sub-channel and a power, the same for each sub-channel, are allocated in step 412. Channel coding and constellation mapping are performed in step 414. It is determined in step 416 whether a sub-channel to be allocated exists. If it is determined in step 416 that a sub-channel to be allocated exists, the power control process proceeds to step 404 to repeat the above-described procedures. If it is determined in step 416 that a sub-channel to be allocated does not exist, the power control process ends.

In order to confirm the performance features of the present invention, experiments were performed under the conditions described below.

[A] An Experiment at a Specific Time (a Specific Scheduling Time $t_n$)

The channel matrix H in this experiment is as follows.

$$H = \begin{bmatrix} h_{1,1} & h_{1,2} & h_{1,3} \\ h_{2,1} & h_{2,2} & h_{2,3} \\ h_{3,1} & h_{3,2} & h_{3,3} \end{bmatrix} = \begin{bmatrix} 2 & 0.9 & 0.6 \\ 0.8 & 3 & 0.5 \\ 0.5 & 0.4 & 0.7 \end{bmatrix},$$

$$X = \begin{bmatrix} x_{1,1} & 0 & 0 \\ 0 & x_{2,2} & 0 \\ 0 & 0 & x_{3,3} \end{bmatrix}, W = \begin{bmatrix} 0.001 \\ 0.001 \\ 0.001 \end{bmatrix}$$

The objective function is as follows.

maximize$\Sigma Y_{diagonal\ entry}$ $-\Sigma Y_{off-diagonal\ entry}$ $\Leftrightarrow$ maximize$2x_{1,1}+3x_{2,2}+0.7x_{3,3}-(1.3x_{1,1}+1.3x_{2,2}+1.3x_{3,3})$ The constraints are as follows.

QoS guarantee: minimum SINR=1.2 dB
Power range: $p_{min}$=3 dBm, $p_{max}$=100 dBm An experimental result performed under the above conditions is shown in Table 2.

| | Allocated power | | Amount of received data | |
|---|---|---|---|---|
| | Same power allocation | Optimized power allocation | Same power allocation | Optimized power allocation |
| $x_{1,1}$ | 100 | 49.36 | 105.57 | 103.77 |
| $x_{2,2}$ | 100 | 33.10 | 128.05 | 103.25 |
| $x_{3,3}$ | 100 | 80.36 | 89.58 | 109.43 |

As shown in Table 2, when the combined power control method according to an exemplary embodiment of the present invention is applied, fairness is increased and power consumption is decreased, compared to a conventional (same power allocation) method.

[B] An Experiment at a Scheduling Time $T=10^4 \cdot t_n$

An experimental environment is shown in Table 3.

TABLE 3

| Cell structure | Hexagonal |
| --- | --- |
| Cell radius | 1 km |
| Number of BS/RSs | 1/6 |
| Path-loss | Lee model |
| Traffic | Full queue |
| Power range | 30 dBm~40 dBm |
| QoS | Minimum SINR = 0 dB |
| Frequency reuse | 1 |
| Adjacent cell interference | No shadowing, uniform distribution |

An experimental result is as follows.

Figure 5:
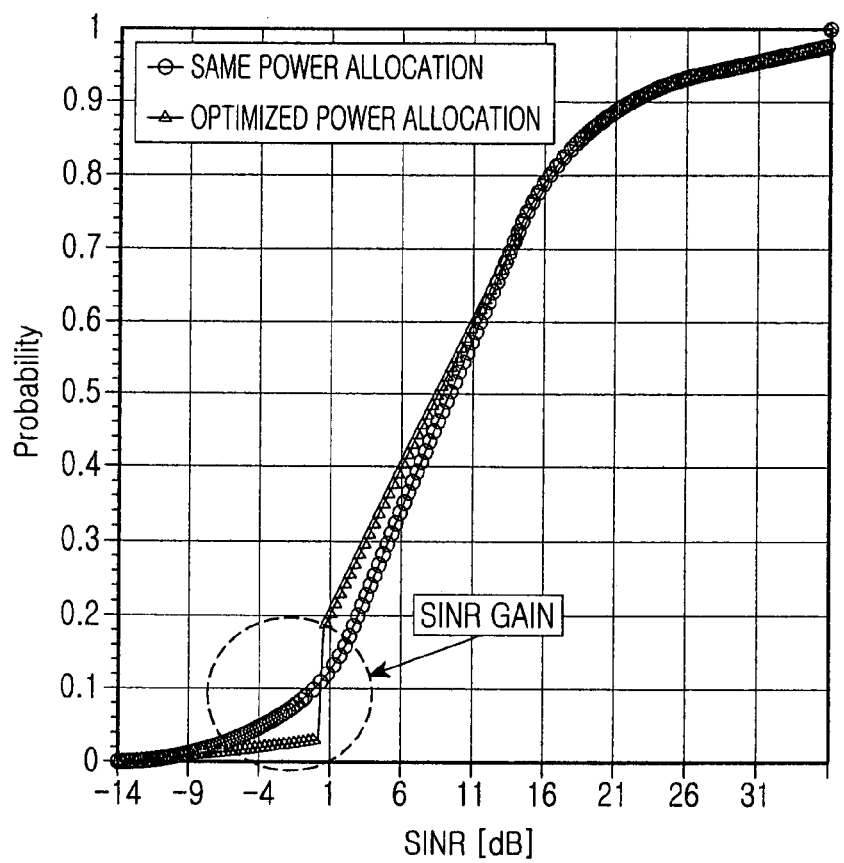
FIG. 5 is a graph showing a comparison result of accumulated distributions of Signal to Interference and Noise Ratio (SINR) values received to an individual MS.

Received SINR: FIG. 5 shows a comparison result of accumulated distributions of SINR values received by an individual MS. As illustrated in FIG. 5, when the combined power control method according to an exemplary embodiment of the present invention is applied, a probability that an SINR value is less than 0 dB, i.e. a probability that user QoS is not satisfied, is significantly decreased compared to a case where the same power is allocated.

Figure 6:
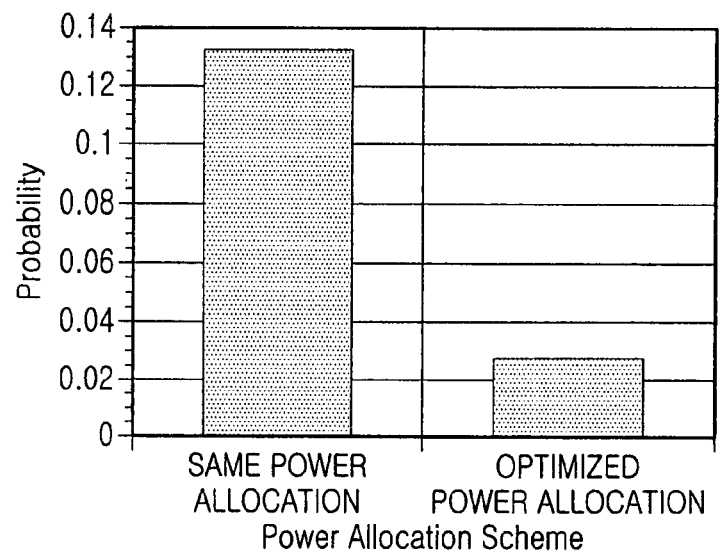
FIG. 6 is a graph showing a comparison result of outage probabilities according to power allocation methods.
Figure 7:
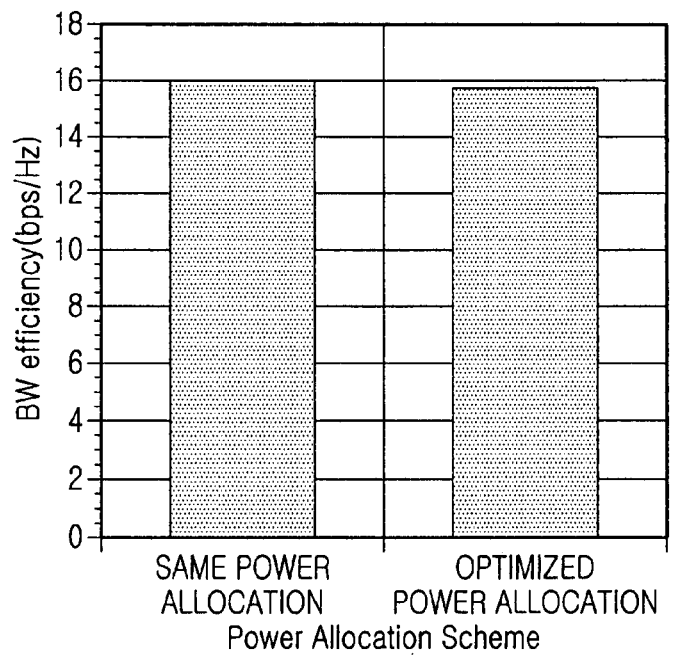
FIG. 7 is a graph showing a comparison result of transmission efficiencies according to power allocation methods.

Outage probability and cell throughput: a user QoS condition is a condition that a received SINR value is greater than 0 dB. As illustrated in FIG. 6, when the combined power control method according to an exemplary embodiment of the present invention is applied, a probability that the user QoS is not satisfied, i.e. an outage probability, is increased compared to the case where the same power is allocated. As illustrated in FIG. 7, the cell throughput is minutely decreased when the combined power control method according to an exemplary embodiment of the present invention is applied, but is not that different from cell throughput of the case where the same power is allocated.

Figure 8:
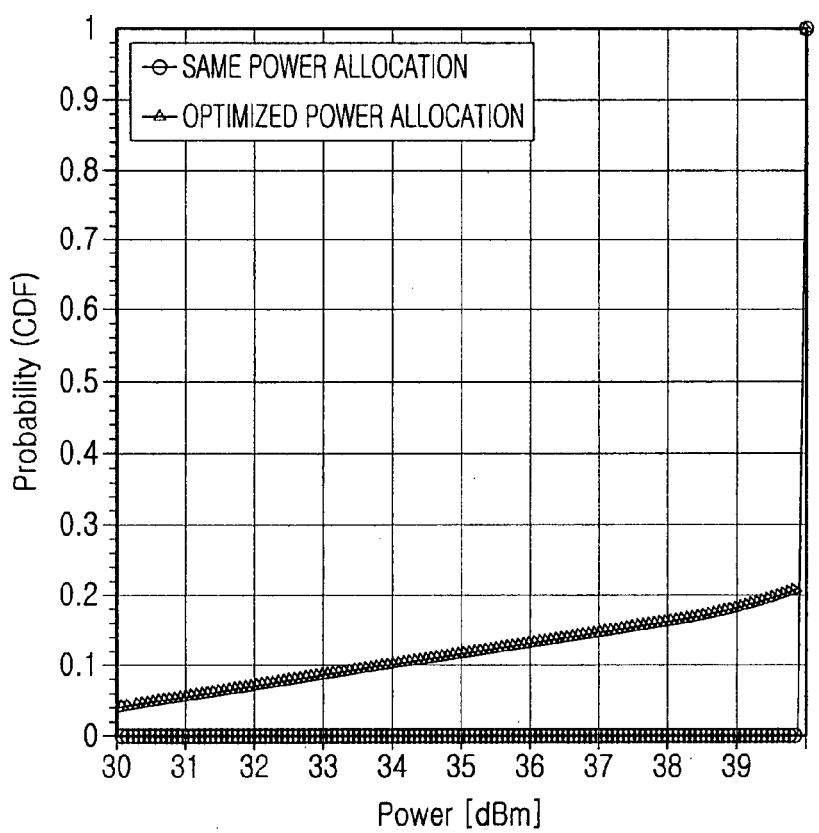
FIG. 8 is a graph showing a comparison result of accumulated distributions of allocated powers according to power allocation methods.

Allocated power: an experimental result illustrated in FIG. 8 shows that accumulated distributions of allocated powers are derived. The combined power control method according to an exemplary embodiment of the present invention does not allocate the maximum power to around 20% of a total of MSs. Thus, a gain in power consumption is obtained compared to the case where the same power, i.e. the maximum power, is allocated to all MSs.

As described above, according to the present invention, a cellular system using wired RSs in a cell can obtain higher transmission efficiency compared to other cellular systems even when a conventional scheduling/resource management method is used. That is, an effect that a plurality of BSs exists in the cell can be obtained. However, in each boundary of service areas of RSs, an outage effect occurs due to interference signals, and fairness is decreased. In order to reduce this disadvantage, by applying a cooperative power control method between a BS and RSs, an outage probability can be decreased, and fairness can be increased.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling power in a Base Station (BS) of a cellular system using wired Relay Stations (RSs), the method comprising:

the RSs and the BS individually performing scheduling of packets to be transmitted to Mobile Stations (MSs) in respective areas of coverage;

the BS increasing a difference between a sum of signals to be transmitted and a sum of interference signals according to a scheduling result, guaranteeing a minimum amount of data to be received by each MS, and calculating a power allocation solution of each MS, which satisfies a condition that the power allocation solution is in a range of allocatable power, which was pre-set by each of the RSs and the BS; and the RSs and the BS performing sub-channel allocation and power allocation according to the power allocation solution satisfying the condition.

2. The method of claim 1, further comprising if no power allocation solution satisfying the condition exists, the RSs and the BS performing sub-channel allocation and allocation of a same power to each sub-channel.

3. The method of claim 1, wherein the BS increases the difference between the sum of signals to be transmitted and the sum of interference signals according to the scheduling result using the formula $$\text{maximize} \sum Y_{diagonal\ entry} - \sum Y_{off\text{-}diagonal\ entry}$$
$$\Leftrightarrow \text{maximize} \sum_k |h_{k,m}|^2 \cdot |x_{k,m}|^2 - \sum_k \sum_{p \neq m}^M |h_{k,p}|^2 \cdot |x_{s(p),p}|^2 + w_k,$$

the minimum amount of data to be received by each MS is guaranteed by guaranteeing the minimum SINR value according to the formula $$\frac{|h_{k,m}|^2 \cdot |x_{k,m}|^2}{\sum_{p \neq m}^M |h_{k,p}|^2 \cdot |x_{s(p),p}|^2 + w_k} \geq \gamma_k^{minimum\ SINR}, \forall k,$$

and the RSs and the BS determine whether the power allocation solution is in the pre-set range of allocatable power, according to the formula below $$\sqrt{p_{min}} \leq |x_{k,m}| \leq \sqrt{p_{max}}, \forall k,$$

where the variable Y denotes a received signal matrix, a (j, i) component of the received signal matrix Y is represented by the formula below $$y_{j,i} = \sum_{m=1}^{M} h_{j,m} \cdot x_{i,m},$$

and the parameters are defined the table below

| Parameter | Description |
|---|---|
| $t_n$ (n = 1, . . . , N) | Scheduling time duration for which a single sub-channel is allocated. |
| k (k = 1, . . . , K) | MS index |
| m (m = 1, . . . , M) | Node (BS/RSs) index |
| $h_{k,m}$ | Channel between a node m and an MS k |
| s(m) | Set of MS indexes receiving a service from a node m |
| $s_{k,m}$ | Signal transmitted from a node m to an MS k |
| $y_{k,m}$ | Signal received from a node m to an MS k |
| $w_k$ | Noise signal in an MS k |
| $P_{min}$, $P_{max}$ | Minimum value and maximum value of power allocated to an MS k |

4. The method of claim 1, wherein a transmission frame of each of the BS and the RSs is comprised of N sub-channels, the transmission frames comprised of N sub-channels are synchronized in a frequency domain and a time domain, a single channel is allocated to only a single MS, and schedulers allocate the same sub-channel to respective MSs at the same time.

5. A system for controlling power in a cellular system using wired Relay Stations (RSs), the system comprising:

a plurality of RSs for transmitting control information of Mobile Stations (MSs) in respective areas of coverage to a Base Station (BS), independently performing scheduling of packets to be transmitted to respective MSs using individual packet schedulers, performing channel coding, constellation mapping, and modulation of frames to be transmitted to the respective MSs, and transmitting the frames to the respective MSs; and a BS for performing scheduling of packets to be transmitted to respective MSs in its area of coverage using individual packet schedulers, performing channel coding, constellation mapping, and modulation of frames to be transmitted to the respective MSs, transmitting the frames to the respective MSs, performing combined power allocation for the packets to be transmitted to the respective MSs, which were scheduled by respective RSs or the BS, based on the control information received from the plurality of RSs, wherein each transmission frame of the BS and the RSs is comprised of N sub-channels, the transmission frames comprised of N sub-channels are synchronized in a frequency domain and a time domain, a single channel is allocated to only a single MS, and the schedulers allocate the same sub-channel to the respective MSs at the same time.

6. The system of claim 5, wherein the BS performs combined power allocation for the packets to be transmitted to the respective MSs by increasing a difference between a sum of signals to be transmitted and a sum of interference signals according to a scheduling result, guaranteeing a minimum amount of data to be received by each MS, and performing power allocation according to a power allocation solution of each MS, which satisfies a condition that the power allocation solution is in a range of allocatable power, which was pre-set by each of the RSs and the BS.

7. A base station (BS) in communication with a plurality of relay stations (RS), the base station comprising:

a processor in communication with a memory, the processor executing code for executing the steps of:

determine a combined power allocation for packets to be transmitted to respective mobile stations (MS) by increasing a difference between a sum of signals to be transmitted and a sum of interference signals according to a scheduling result, guaranteeing a minimum amount of data to be received by each MS, and performing power allocation according to a power allocation solution of each MS, which satisfies a condition that the power allocation solution is in a range of allocatable power, which was pre-set by each of the RSs and the BS.

8. The base station of claim 7, wherein the processor increases the difference between the sum of signals to be transmitted and the sum of interference signals according to the scheduling result using the formula $$\text{maximize} \sum Y_{diagonal\ entry} - \sum Y_{off\text{-}diagonal\ entry}$$

$$\Leftrightarrow \text{maximize} \sum_{k} |h_{k,m}|^2 \cdot |x_{k,m}|^2 - \sum_{k} \sum_{p \neq m}^{M} |h_{k,p}|^2 \cdot |x_{s(p),p}|^2 + w_k,$$

the minimum amount of data to be received by each MS is guaranteed by guaranteeing the minimum SINR value according to the formula $$\frac{|h_{k,m}|^2 \cdot |x_{k,m}|^2}{\sum_{p \neq m}^{M} |h_{k,p}|^2 \cdot |x_{s(p),p}|^2 + w_k} \geq \gamma_k^{minimum\ SINR}, \forall k,$$

and the RSs and the BS determine whether the power allocation solution is in the pre-set range of allocatable power, according to the formula $$\sqrt{p_{\min}} \leq |x_{k,m}| \leq \sqrt{p_{\max}}, \forall k,$$

where the variable Y denotes a received signal matrix, a (j, i) component of the received signal matrix Y is represented by the formula below $$y_{i,j} = \sum_{m=1}^{M} h_{j,m} \cdot x_{i,m},$$

and the parameters are defined the table below

| Parameter | Description |
|---|---|
| $t_n$ (n = 1, . . . , N) | Scheduling time duration for which a single sub-channel is allocated. |
| k (k = 1, . . . , K) | MS index |
| m (m = 1, . . . , M) | Node (BS/RSs) index |
| $h_{k,m}$ | Channel between a node m and an MS k |
| s(m) | Set of MS indexes receiving a service from a node m |

-continued

| Parameter | Description |
|---|---|
| $s_{k,m}$ | Signal transmitted from a node m to an MS k |
| $y_{k,m}$ | Signal received from a node m to an MS k |
| $w_k$ | Noise signal in an MS k |
| $P_{min}$, $P_{max}$ | Minimum value and maximum value of power allocated to an MS k |

9. The base station of claim 7, wherein a transmission frame of each of the BS and the RSs is comprised of N sub-channels, the transmission frames comprised of N sub-channels are synchronized in a frequency domain and a time domain, a single channel is allocated to only a single MS, and schedulers allocate the same sub-channel to respective MSs at the same time.

10. The base station of claim 7, further comprising:
means for receiving control information of Mobile Stations (MSs) within each of the RS's respective area of coverage.

11. A base station (BS) in communication with a plurality of relay stations (RS), the base station comprising:
means for determine a combined power allocation for packets to be transmitted to respective mobile stations (MS) by increasing a difference between a sum of signals to be transmitted and a sum of interference signals according to a scheduling result;
means for guaranteeing a minimum amount of data to be received by each MS; and
means for performing power allocation according to a power allocation solution of each MS, which satisfies a condition that the power allocation solution is in a range of allocatable power, which was pre-set by each of the RSs and the BS.

12. The base station of claim 11, wherein the increasing the difference between the sum of signals to be transmitted and the sum of interference signals according to the scheduling result using the formula $$\text{maximize} \sum Y_{diagonal\ entry} - \sum Y_{off\text{-}diagonal\ entry}$$

$$\Leftrightarrow \text{maximize} \sum_k |h_{k,m}|^2 \cdot |x_{k,m}|^2 - \sum_k \sum_{p \neq m}^M |h_{k,p}|^2 \cdot |x_{s(p),p}|^2 + w_k,$$

the minimum amount of data to be received by each MS is guaranteed by guaranteeing the minimum SINR value according to the formula $$\frac{|h_{k,m}|^2 \cdot |x_{k,m}|^2}{\sum_{p \neq m}^M |h_{k,p}|^2 \cdot |x_{s(p),p}|^2 + w_k} \geq \gamma_k^{minimum\ SINR}, \forall k,$$

and
the RSs and the BS determine whether the power allocation solution is in the pre-set range of allocatable power, according to the formula $$\sqrt{p_{min}} \leq |x_{k,m}| \leq \sqrt{p_{max}}, \forall k,$$

where the variable Y denotes a received signal matrix, a (j, i) component of the received signal matrix Y is represented by the formula below $$y_{i,j} = \sum_{m=1}^M h_{j,m} \cdot x_{i,m},$$

and
the parameters are defined the table below

| Parameter | Description |
|---|---|
| $t_n$ (n = 1, ..., N) | Scheduling time duration for which a single sub-channel is allocated. |
| k (k = 1, ..., K) | MS index |
| m (m = 1, ..., M) | Node (BS/RSs) index |
| $h_{k,m}$ | Channel between a node m and an MS k |
| s(m) | Set of MS indexes receiving a service from a node m |
| $s_{k,m}$ | Signal transmitted from a node m to an MS k |
| $y_{k,m}$ | Signal received from a node m to an MS k |
| $w_k$ | Noise signal in an MS k |
| $P_{min}$, $P_{max}$ | Minimum value and maximum value of power allocated to an MS k |

13. The base station of claim 11, wherein a transmission frame of each of the BS and the RSs is comprised of N sub-channels, the transmission frames comprised of N sub-channels are synchronized in a frequency domain and a time domain, a single channel is allocated to only a single MS, and schedulers allocate the same sub-channel to respective MSs at the same time.

14. The base station of claim 11, further comprising:
means for receiving control information of Mobile Stations (MSs) within each of the RS's respective area of coverage.

* * * * *